(12) United States Patent
Wallach

(10) Patent No.: US 6,934,515 B2
(45) Date of Patent: Aug. 23, 2005

(54) ELECTROMAGNETIC RADIATION ALERTING DEVICE FOR USE WITH A CELLULAR TELEPHONE

(75) Inventor: Alon Wallach, Ramat Gan (IL)

(73) Assignee: Wireless Avionics Ltd., Rosh Haain (IL)

( * ) Notice: Subject to any disclaimer, the term of this patent is extended or adjusted under 35 U.S.C. 154(b) by 846 days.

(21) Appl. No.: 09/891,234

(22) Filed: Jun. 27, 2001

(65) Prior Publication Data

US 2002/0011828 A1 Jan. 31, 2002

Related U.S. Application Data

(60) Provisional application No. 60/214,491, filed on Jun. 27, 2000.

(51) Int. Cl.[7] ............................................. H04M 17/00
(52) U.S. Cl. ................................ 455/67.13; 455/67.16; 455/226.1
(58) Field of Search ......................... 455/67.13, 67.16, 455/115.1, 115.4, 226.1, 226.4, 227, 228

(56) References Cited

U.S. PATENT DOCUMENTS

| | | | | |
|---|---|---|---|---|
| 4,340,854 | A | * 7/1982 | Jones et al. ................... | 324/623 |
| 4,968,968 | A | * 11/1990 | Taylor ......................... | 342/174 |
| 5,140,703 | A | * 8/1992 | Payne ......................... | 455/226.1 |
| 5,336,896 | A | 8/1994 | Katz | |
| 5,524,275 | A | 6/1996 | Lindell | |
| 5,749,909 | A | 5/1998 | Schroeppel et al. | |
| 5,825,283 | A | 10/1998 | Camhi | |
| 5,839,096 | A | * 11/1998 | Lyons et al. ................ | 702/183 |
| 5,907,307 | A | 5/1999 | Bickert et al. | |
| 5,953,646 | A | 9/1999 | Hirasawa | |
| 6,426,983 | B1 | * 7/2002 | Rakib et al. ................. | 375/346 |
| 6,438,162 | B1 | * 8/2002 | Boyd et al. .................. | 375/232 |
| 6,711,258 | B1 | * 3/2004 | Sung ...................... | 379/390.01 |

FOREIGN PATENT DOCUMENTS

WO      WO 95 03549 A     2/1995

OTHER PUBLICATIONS

ICNIRP, Guidelines for Limiting Exposure to Time–Varying Electric, Magnetic and Electromagnetic Fields (up to 300 Hz), (published in health physics, Apr. 1998, vol. 74, No. 4).
Patent Abstracts of Japan. vol. 1999, No. 03, Mar. 31, 1999 & JP 10 320668 A (Nagata Denki KK), Dec. 4, 1998.
Patent Abstract of Japan. vol. 1999, No. 05, May 31, 1999 & JP 11 033125 A (Oki Electric Ind CO Ltd.), Feb. 9, 1999.
Patent Abstracts of Japan. vol. 1997, No. 08, Aug. 29, 1997 & JP 09 102766 A (Canon Inc.) Apr. 15, 1997.
European Search Report from EP 01 94 5591.
International Search Report from PCT/IL01/00585.

* cited by examiner

Primary Examiner—Bing Q. Bui
(74) Attorney, Agent, or Firm—Pearl Cohen Zedek Latzer, LLP

(57) ABSTRACT

A personal radiation-alerting device for use with a cellular telephone is provided. The radiation alerting device may comprise a radio frequency (RF) sampling unit adapted to measure the amplitude of the electromagnetic field generated by the cellular telephone over time, a computing unit adapted to compute the amplitude over time and to compare it with a predefined reference level and an alerting unit adapted to output an alert whenever the electromagnetic field exceeds the predefined reference level.

41 Claims, 5 Drawing Sheets

ELECTROMAGNETIC RADIATION ALERTING DEVICE FOR USE WITH A CELLULAR TELEPHONE

CROSS-REFERENCE TO RELATED APPLICATIONS

The present application claims priority from U.S. Provisional Application Ser. No. 60/214,491, filed Jun. 27, 2000, which is incorporated herein by reference.

FIELD OF THE INVENTION

The present invention relates to devices that measure electromagnetic radiation, in general, and to devices that can be used in conjunction with portable cellular telephones, in particular.

BACKGROUND OF THE INVENTION

Radiation emitted by cellular telephones has been recognized as a potential worldwide health hazard. Although it is commonly believed that the power output of the cellular telephone is constant over time, this is not borne out by facts.

CDMA cellular telephones vary their power over a very wide range. TDMA and GSM cellular telephones usually switch between "high" and "low" power in inverse relation to their proximity to the cell. The cellular telephones determine how to vary their power levels by measuring the reception level of the cellular telephone from the nearest cell. Therefore, the radiation emitted by cellular telephones while in transmission mode is not constant over time. These facts, taken with the potential and serious health hazards, provide great medical and economic motivation to measure and compute the actual radiation power and exposure, and to compare the results with known health-protection standards.

The International Commission on Non Ionizing Radiation Protection (ICNIRP) and its American counterpart ANSI/IEEE are organizations that have defined recognized standards for radiation limits that are indisputable in the cellular industry, scientific, and health communities. Lacking evidence of carcinogenic side effects from exposure to cellular telephones from other bodies, the standards defined by the above organizations may provide safety criteria. These standards are recognized and accepted by the cellular telephones and wireless communication equipment manufacturers.

ICNIRP, in its October 1997 guidelines document, "*Guidelines for Limiting Exposure to Time-Varying Electric, Magnetic, and Electromagnetic Fields (up to 300 Hz)*" (published in health physics, April 1998, volume 74, number 4), states the exposure limitation values for the general public.

For example, the permitted exposure levels are defined in power density units (e.g. W/m2) or in specific energy absorption rate (SAR) units (e.g. Watt/Kg). The permitted Level for the public, in the 900 MHz frequency range, is 2 Watt/Kg in the head and trunk parts of the body. Calculations and mathematical modeling give a reference-electromagnetic field (EMF) value of 41 V/m or power density of 0.45 mW/square cm.

Any person skilled in this field understands that although the ICNIRP standard is the respected norm today, it might be updated or replaced by a different and even more cautious standard in the coming years, as knowledge regarding electromagnetic radiation health hazardous expands.

While companies in the cellular telephone arena are aware and apprehensive of dangers emanating from emitted radiation and the standard (e.g., ICNIRP) is known and accepted, the technology for providing cellular telephones with warning capability lags far behind. Laboratory equipment and test instruments that measure levels of electromagnetic radiation are known. However, these instruments are expensive (cost hundreds and thousands of dollars), bulky and impractical for daily use for the public. The field of electromagnetic measurements by probes and related equipment is considered highly specialized and out of the scope of the general public.

Some low cost accessories in the market provide a flashing light emitting diode (LED), a buzzer, or vibration warning when detecting a strong radio frequency (RF) signal in their vicinity. Although these components draw the cellular telephone user's attention to an incoming call, they do not provide any early warning regarding emitted radiation, as they all operate momentarily, regardless of the accumulated energy absorbed by the user. All these existing technologies therefore have no relevance to safety issues.

Some analog and digital units available on the market detect and measure radiation leakage, For example, instruments that measure radiation leakage from microwave ovens. These units are momentary power meters which do not take into account the long term accumulated exposure. It is up to the user to decide whether the electromagnetic lee level is acceptable.

Additionally, several 'passive' protection accessories have been introduced recently on the market. For example, electromagnetic shields in the form of cellular telephone cases. These cases include a cover for the antenna, and are made of materials that 'absorb' electromagnetic radiation.

These cases are heavy and must be produced in different sizes and shapes, because of constant changes in cellular telephones sizes and shapes. Since the cases hide the antenna, they have an adverse affect on the quality of reception and/or transmission of the cellular telephone. The protective cases provide a constant protection level regardless of the changing levels of electromagnetic radiation that the cellular telephones emit in the course of operation.

SUMMARY OF THE INVENTION

The striking deficiencies of existing technologies, outlined above, lead to the inescapable conclusion that there is a pressing need for radiation warning devices that measure cumulative exposure to electromagnetic radiation over time, in accordance with recognized standards such as the ICNIRP standard.

Some embodiments of the present invention seeks to provide portable early radiation-warning electronic device of small dimensions and low cost that may be attached to a cellular telephone. The device may be attached to the antenna of a cellular telephone, directly to the body of the cellular telephone or to the replaceable cover of cellular telephone. Alternative, according to some embodiments of the present invention the device may be integrated in the battery of the cellular telephone or in the cellular telephone itself.

In accordance with some embodiments of the present invention, a radiation-alerting device for use with a cellular telephone is provided. The radiation alerting device may comprise a radio frequency (RF) sampling unit adapted to measure the peak and average amplitude of the electromagnetic field generated by the cellular telephone over time, a computing unit adapted to compute the amplitude over time and to compare it with a predefined reference level and an alerting unit adapted to output an alert whenever the electromagnetic field exceeds the predefined reference level.

There is also provided in accordance with some embodiments of the present invention a radiation-alerting cellular telephone battery. The battery may comprise a current sampling unit adapted to measure indirectly the amplitude of the EW generated by a cellular telephone during its active transmission time. There is also provided in accordance with some embodiments of the present invention a radiation-alerting cellular telephone. The cellular telephone may further comprise RF sampling means or may use existing sampling means. The activation and sensitivity setting for the alert may be installed from a dedicated menu on display of the cellular telephone or a factory set with default values may be installed during manufacture.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

Figure 1:
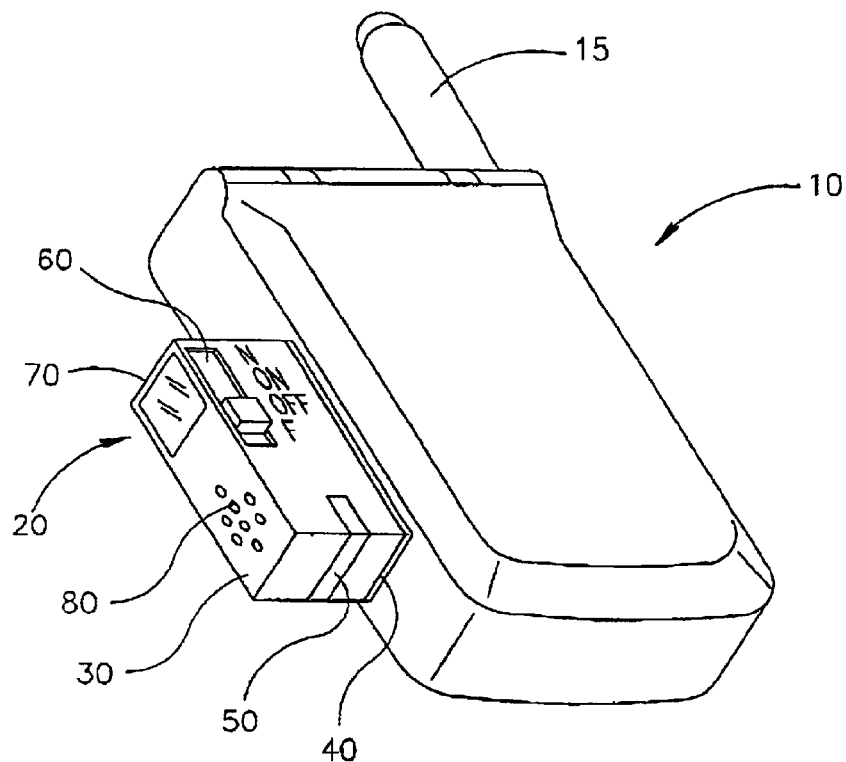
FIG. 1 is an illustration of a cellular telephone equipped with a radiation-alerting device constructed and operated in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Figure 1A:
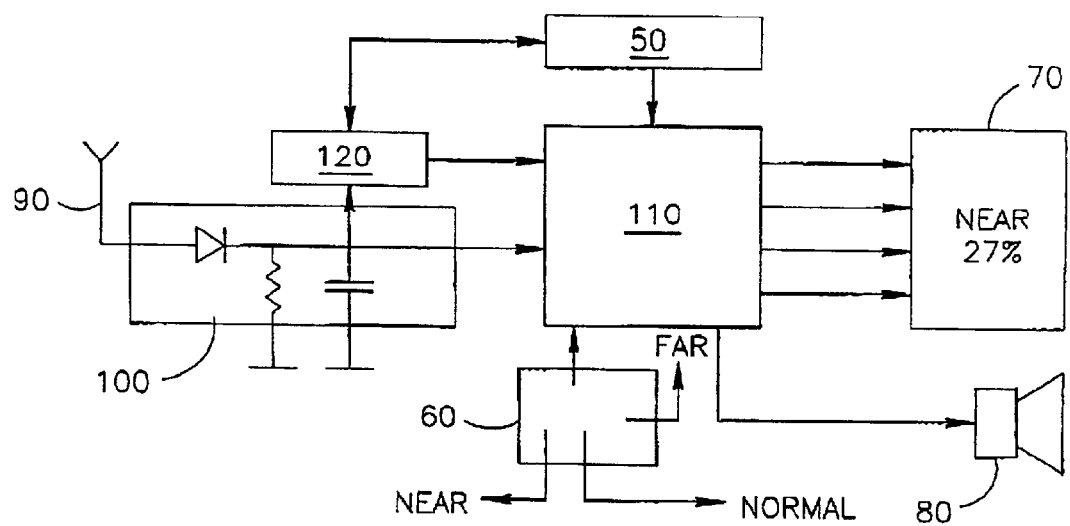
FIG. 1A is a schematic illustration of the electrical components of the device shown in FIG. 1.

Reference is made to FIGS. 1 and 1A. FIG. 1 illustrates a cellular telephone equipped with radiation-alerting device being an add-on and stand-alone device constructed and operated in accordance with some embodiments of the present invention.

A radiation-alerting device 20 may be attached to a cellular telephone 10 relatively near an antenna 15. The attachment demonstrated in the drawing employs a double-sided adhesive tape 40. Any professional in the field would deduct that attachment can also be made by other means. Moreover, the device may be assembled as an integral part of replaceable fashion covers or attached to them.

Device 20 may comprise a body 30, a battery 50, a multi-state manual mode switch 60, a display 70 and optionally an audio warning device 80 such as a buzzer. Battery 50 may be adapted to provide the required power supply to device 20, therefore making it a stand-alone device. Multi-state manual mode switch 60 is adapted to set device 20 according to the distance of the user's head form antenna 15. Display 70 is adapted to show the level of radiation. Non-limiting examples of displays include a liquid crystal display (LCD), a light emitting diode display (LED) array, a bar graph LED display and the like.

FIG. 1A illustrates schematically the electrical components of device 20 shown in FIG. 1. Device 20 may comprise an antenna 90 adapted to receive the RF signals generated by antenna 15 of by cellular telephone 10.

Device 20 may filter comprise an RF sampling unit 100 coupled to antenna 90, a micro-controller 110 coupled to RF sampler 100 and a squelch circuit 120 coupled to sampler 100 and to micro-controller 110. RF sampling unit 100 may be adapted to measure the amplitude of the EMF generated by cellular telephone 10 during its active transmission time. Tile amplitude may be formed by modulation type such as continouos wave (CW), pulse and spread spectrum. Non-limiting examples of RF sampling unit include a simple rectifier and an RE sampler. It should be noted that RF sampling unit is adapted to operate in an analog or digital cellular transmission including but not limited to code division multiple access (CDMA), time division multiple access (TDMA) and global system for mobile communications (GSM).

Micro-controller 110 (e.g. Motorola 68hc05 or Intel 8051 or any member of the microchip PIC line of products) may be adapted to compute, over time, measurements received from RF sampling unit 100. These measurements are compared to a predefined reference level. Non-limiting example of such a reference may be the levels of permitted radiation over time as defined in the ICNIRP standards. During operation, the output of RF sampling unit 100 may be fed via a low pass filter (not shown) to an analog input of an A/D converter (not shown) of micro-controller 110. It should be understood to a person skilled in the art that any equivalent analog/digital integrated circuit/discrete combination might replace the A/D converter.

The accumulated radiation level may be computed over different times. Consequently, the alarm may be the highest of several computations. For example, a peak time (e.g. several seconds), an average short term (e.g. 6 minutes) and an average long term (e.g. 30 minutes). Any person skilled in the art will appreciate that each of these computations or integration may be compared and calculated by micro-controller 110 as percentage of predefined maximum reference levels.

When the accumulated electromagnetic radiation exceeds a predefined level, display 70 and buzzer 80 may alert the cellular telephone holder. Buzzer 80 may be driven by an audio voltage controlled oscillator (not shown) able to provide audio alerts in several beep styles, corresponding to different integrated radiation levels computed by micro-controller 110. Other alerting means may be a flashing LED. This may reduce the size and cost of device 20. A combination of LED and/or buzzer, with a selector switch to choose between them, is also an option that any person skilled in the art will appreciate.

Device 20 shown in FIGS. 1 and 1A is operated in three different modes. As mentioned before in reference to FIG. 1, the device is equipped with a manual multi-mode switch 60 and the telephone holder can set the device according to the distance between the cellular telephone's antenna 15 and his head.

For example, mode switch 60 may comprise three modes—"near", "normal" and "far" calibrated for different distances of the user's head from antenna 15. A "near" mode may correspond to "on the ear" state at approximately 2 cm. A "normal" mode may correspond to "in the chest pocket while using earphone" state at approximately 10 cm. A "far" mode may correspond to "with speakerphone" state at approximately 60 cm. The selected setting may also be displayed on display 70.

Squelch circuit 120 may be adapted to receive signals from RF sampling unit 100. In order to save power and to extend the battery life, the A/D converter and power consuming parts of the system may operate only when a threshold radiation is detected by squelch circuit 120. These two subsystems may be implemented by means of a very low quiescent current discrete design. Battery 50 may be a rechargeable type in order to increase the battery life. In this case, squelch circuit 120 may have a tap (not shown) for charging the battery from the voltage and energy coming from RF sampling unit 100, therefore using the radiated emission from the cellular telephone.

A cellular telephone user may attach device 20 to cellular telephone 10 near radiation-emitting antenna 15. Then the user may set manual mode switch 60 to approximately the distance between his head and antenna 15 (e.g. "near", "normal" or "far"). Changing the settings of mode switch may calibrate micro-controller 110 to respond whenever the corresponded accumulated radiation level over time reaches one of a plurality of predefined levels.

The absorbed radiation may be measured using RF sampling unit 100 that is adapted to measure the EMF generated by the cellular telephone's antenna 15 during its active transmission times. For digital cellular telephones such as GSM, TDMA and the like, the transmission is not continuos, but rather in pulse form. In the case of pulse transmission, RF sampling unit 100 may detect the pulse of the EMF and may provide a pulse output to squelch circuit 120 and an averaged direct current (DC) voltage to micro-controller 110. The pulse signal may be averaged by a resistor capacitor filter (not shown), which may be either at the output of RF sampling unit 100 or at the input of micro-controller 110. When the output of unit 100 exceeds a predefined threshold, squelch circuit 120 may enable micro-controller 110 to consume the adequate power. In operation, micro-controller 110 may drive display 70 that displays the radiation level of cellular telephone 10, as computed and integrated by micro-controller 110. In addition, micro-controller 110 may initiate buzzer 80, to sound an alert.

Figure 2:
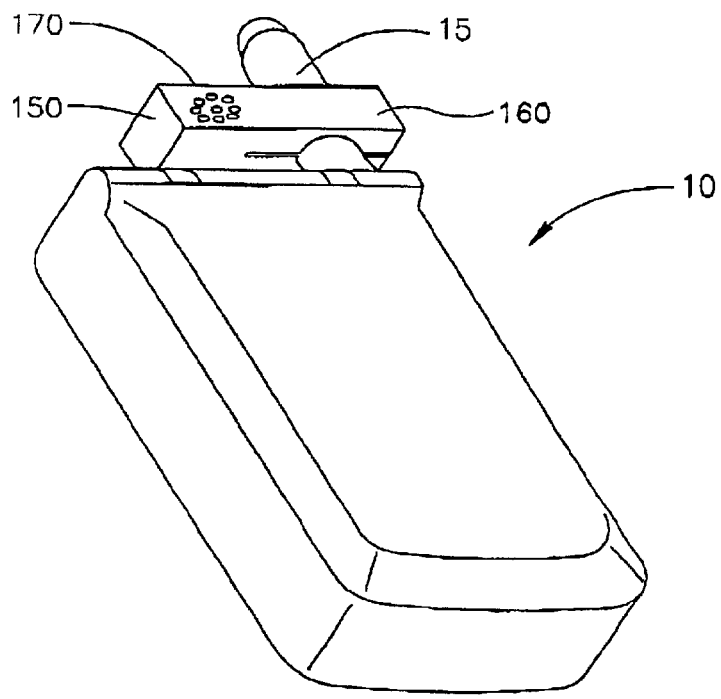
FIG. 2 illustrates a cellular telephone equipped with a radiation-alerting device getting its power from the emitted radiation of the cellular telephone constructed and operated in accordance with some embodiments of the present invention.
Figure 2A:
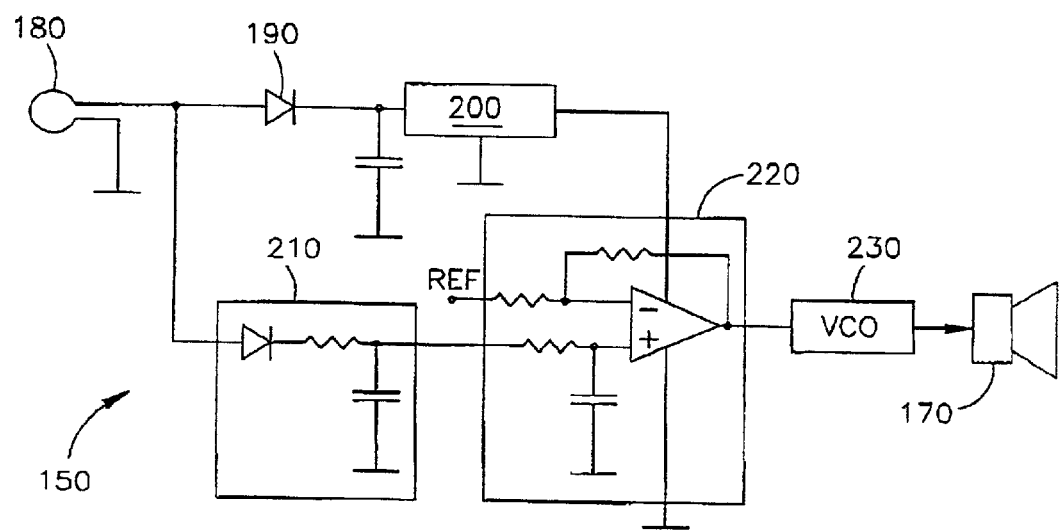
FIG. 2A is a schematic illustration of the electrical components of the device shown in FIG. 2.

Reference is now made to FIGS. 2 and 2A. FIG. 2 is an illustration of a cellular telephone equipped with radiation-alerting device being an add-on and stand-alone device 150, constructed and operated in accordance with some embodiments of the present invention. In these embodiments, device 150 may get power from the radiation emitted from antenna 15 of the cellular telephone 10.

Radiation-alerting device 150 may comprise an attaching unit 160 adapted to attach device 150 to antenna 15. Non-limiting examples of attaching unit 160 include a mechanical clip, a double-sided adhesive strip, a spring clip, a ring and the like. For cellular telephones with internal (unseen) antenna, device 150 may be attached to an area closest to the internal antenna.

FIG. 2A, illustrates schematically the electrical components of device 150 of FIG. 2. According to some embodiments of the present invention, device 150 may be an add-on stand-alone non-battery device. Device 150 may comprise a high-efficiency low-loading to 180, a diode-capacitor rectifier 190 coupled to high-efficiency low-loading turn 180 and optionally a voltage regulator 200 coupled to a diode-capacitor rectifier 190. Alternatively, a parallel conductor may replace turn 180.

Device 150 may draw power from the emitted radiation with a high-efficiency low-loading turn 180 placed around antenna 15 and coupled to diode-capacitor rectifier 190. Alternatively, a parallel conductor (not shown) coupled to antenna 15 and to diode-capacitor rectifier 190 may supply power to device 150. In these embodiments, only the "near" mode may be operable.

Device 150 may further comprise alerting unit 170 and optionally an oscillator 230 coupled to alerting unit 170. A non-limiting example of alerting unit may be a buzzer driven by an oscillator. Additional audio beep styles may be used in order to compensate for the lack of a display. Alternatively, device 150 may comprise a display.

Device 150 may further comprise by an integration network 210 and a comparator 220 coupled to integration network 210. In these embodiments, the integration of the radiation over time may be performed by integration network 210. Integration network 210 may comprise a diode, a resistor and a capacitor. Comparator 220 may fill the role of computing means, obviating the need for high energy consuming components, such as the micro-controller 110 described with respect to FIG. 1A. The computation may be extrapolated by sounding an alert before the required time interval has elapsed. This may also simplify the design and reduce the cost of the device.

Any person skilled in the art will appreciate that in these embodiments and in the "near" mode of the embodiments described with respect to FIG. 1, some degree of shielding or screening from the RF radiation may be required. The device may incorporate protection to at least certain of the components from the RF emitted from the cellular telephone. Such screening (not shown in the figures) may be realized by applying conductive paint or coating to the device or to its sampling and computing components.

Figure 3:
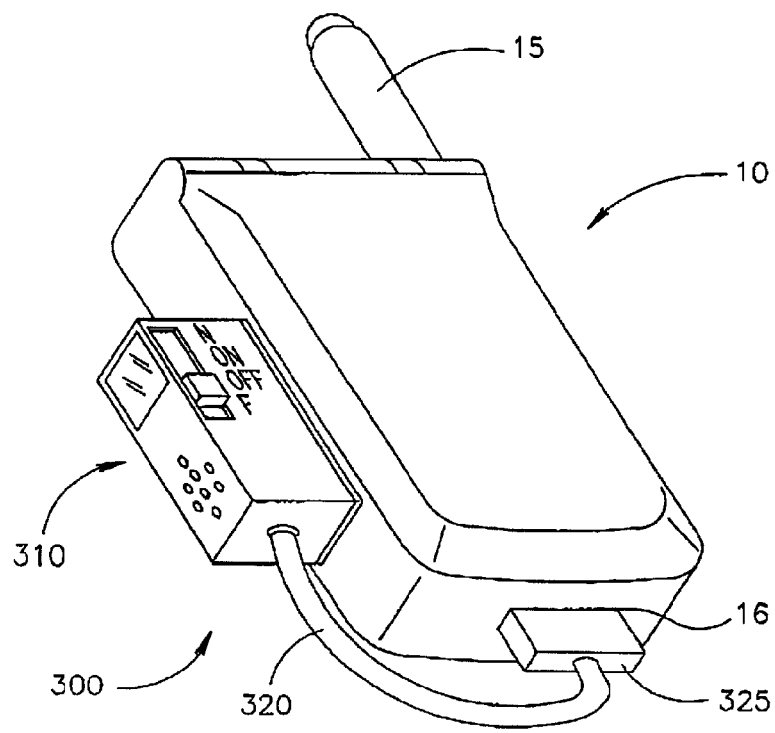
FIG. 3 is a illustration of a cellular telephone a radiation-alerting device connected to the cellular telephone trough the telephone accessories socket constructed and operated in accordance with some embodiments of the present invention.
Figure 3A:
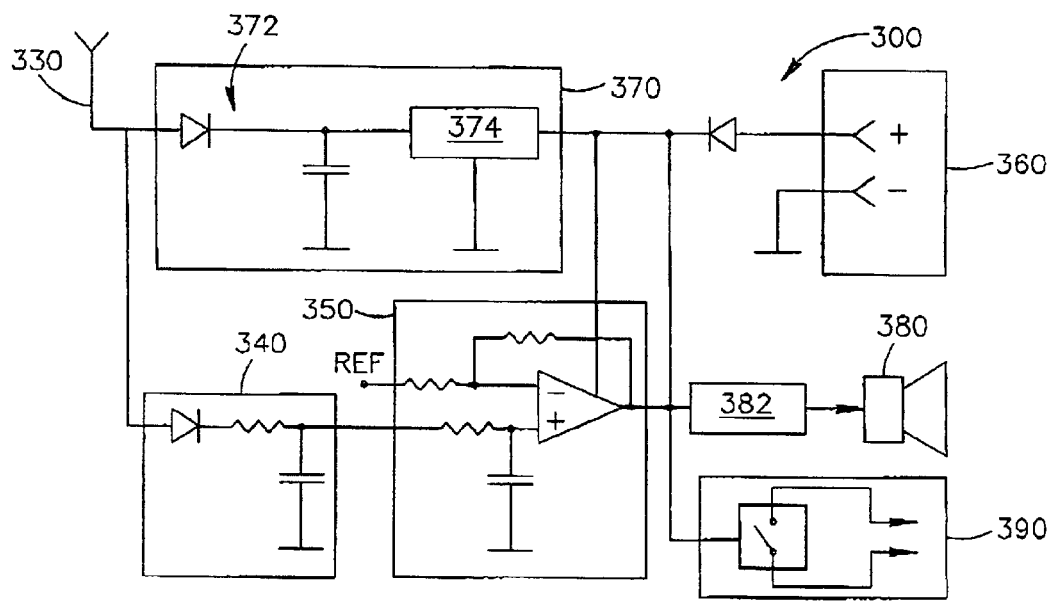
FIG. 3A is a schematic illustration of the electrical components of the device shown in FIG. 3.

Reference is now made to FIGS. 3 and 3A. FIG. 3 illustrates a cellular telephone equipped with a radiation-alert device 300 being an add-on device constructed and operated in accordance with some embodiments of the present invention. A radiation-alert device body 310 may be connected a cable 320 and a plug 325 to a cellular telephone accessories socket 16 and may potentially draw power from the telephone battery (not shown). Any person skilled in the art will appreciate that the device may be formed with an integral plug without the need for a cable. However, the distance between the location of device's body 310 and antenna 15 has to be within the calibrated setting.

Device 300 may draw its voltage feed from the DC of the power source of cellular telephone 10. A further capability may be to disconnect automatically ongoing calls when the radiation level exceeds the allowable predefined level. As will be described hereinbelow with respect to FIG. 3A, the disconnecting may be performed similarly to the way that standard "send" and "end" commands are transmitted through the accessory socket 16 by personal earphone-microphone cellular telephone sets.

Reference is additionally made to FIG. 3A, which is a schematic illustration of the electrical components of the device shown in FIG. 3. Device 300 may comprise an antenna 330 adapted to receive the emitted radiation, an RF sampler 340 and a comparator 350 coupled to sampler 340. Cooperator 350 may be adapted to compute over time measurements received from sampler 340 and to compare the measurement to a predefined reference level.

Device 300 may further comprise a DC connector 360 and an additional DC power supply 370. Power supply 370 may comprise a diode-capacitor rectifier 372 and optionally a voltage regulator 374. DC connector 360 is connectable to the cellular telephone's DC power source through its accessory socket 16 (if available).

Alternatively or additionally to antenna 330, device 300 may comprise a high-efficiency low-loading turn (not shown) around antenna 15 or a parallel conductor (not shown). The turn or the parallel conductor may be coupled to diode-capacitor rectifier 372 (with or without voltage regulator 374). In such a case, DC power supply 370 may be adapted to draw power from the emitted radiation with the high-efficiency low-loading turn or with the parallel conductor.

Device 300 may further comprise an oscillator 382 coupled to comparator 350 and a buzzer 380 coupled to oscillator 382. Comparator 350 may drive oscillator 382 and buzzer 380. Device 300 may comprise additional alerting means such as an analog switch 390 adapted to be driven by comparator 350 and connectable to the "end" command pins inside the cellular telephone's accessory socket Therefore, when the computed radiation exceeds a predefined level, analog switch 390 may close by sending an "end" command.

Figure 4:
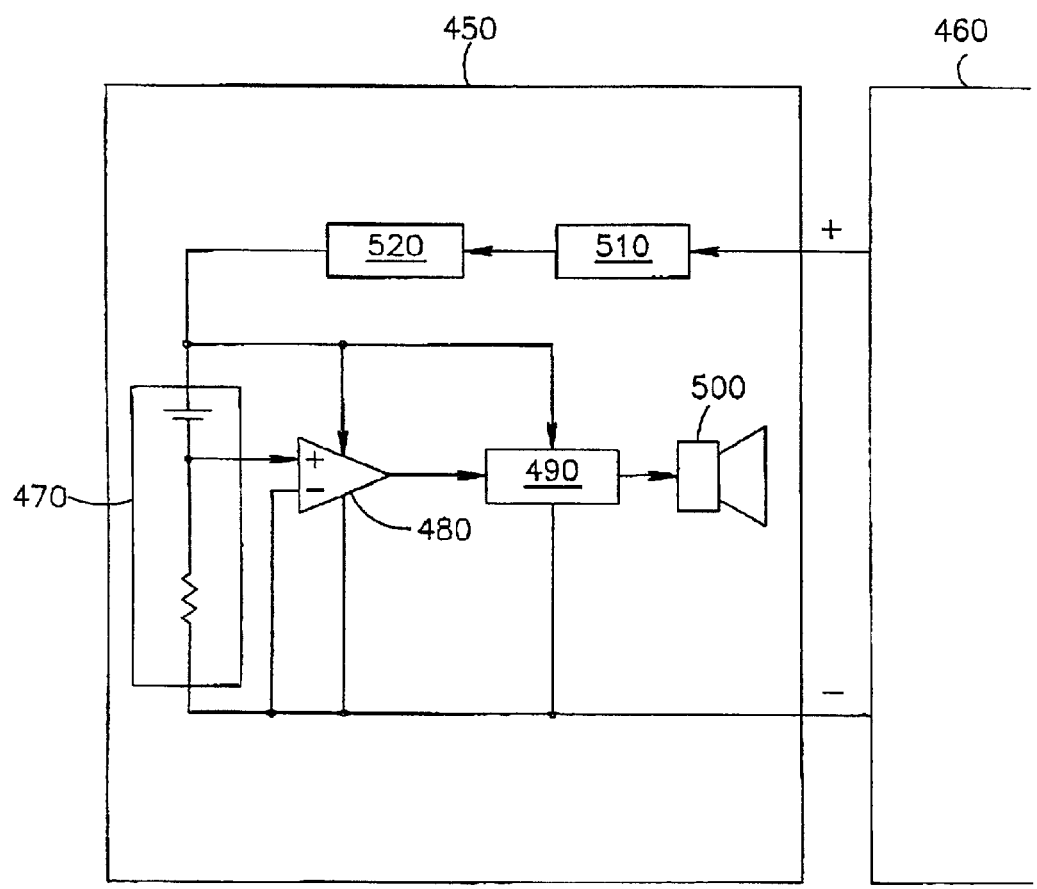
FIG. 4 is a schematic illustration of the electrical components of a cellular telephone battery having radiation detection capabilities in accordance with some embodiments of the present invention.

Reference is now made to FIG. 4, which is a schematic illustration of the electrical components of a cellular telephone battery 450, integrally equipped with elements enabling radiation detecting according to some embodiments of the present invention. In these embodiments, the alert capabilities are provided by a new type of battery without the need to add on additional external devices to a cellular telephone 460.

Although these embodiments demonstrates a simpler and less accurate sampling and computing means, any person skilled in the art will understand that other components may be utilized.

Battery 450 may comprise a sampling resistor 470, a DC amplifier 480 coupled to resistor 470 and a micro-controller 490 coupled to amplifier 480. Battery 450 may further comprise an alerting unit 500 coupled to micro-controller 490, a protection fuse 520 coupled to resistor 470 and a thermal charging fuse 510 coupled protection fuse 520.

In these embodiments, the sampling may be performed by sampling the current drawn from battery 450 through sampling resistor 470 having a very law resistance. The readings are fed to DC amplifier 480, which may feed micro-controller 490. Micro-controller 490 may drive alerting unit 500, which may be a buzzer.

Additionally, micro-controller 490 may measure the voltage. The voltage may be fed through the thermal charging fuse 510 of the battery and the protection fuse 520 to sampling resistor 470, to the DC amplifier 480 and to micro-controller 490.

The computation is based on the assumption at the current drawn from the battery is a linear indication to the RF power output. This assumption may be suitable especially for cases in which the cellular telephone transmits at high power levels. Micro-controller 490 may be pre-programmed to calculate P=V*I equation where P is the power, V is the voltage and I is the current. Then, the energy consumed over time may be calculated using the E=P*T equation. The energy consumption is proportional to the accumulated radiation. Thereafter, micro-controller 490 may compare the accumulated radiation-related value to a predefined reference parameter and may drive buzzer 500 to sound the alarm when the radiation exceeds the predefined levels.

Figure 5:
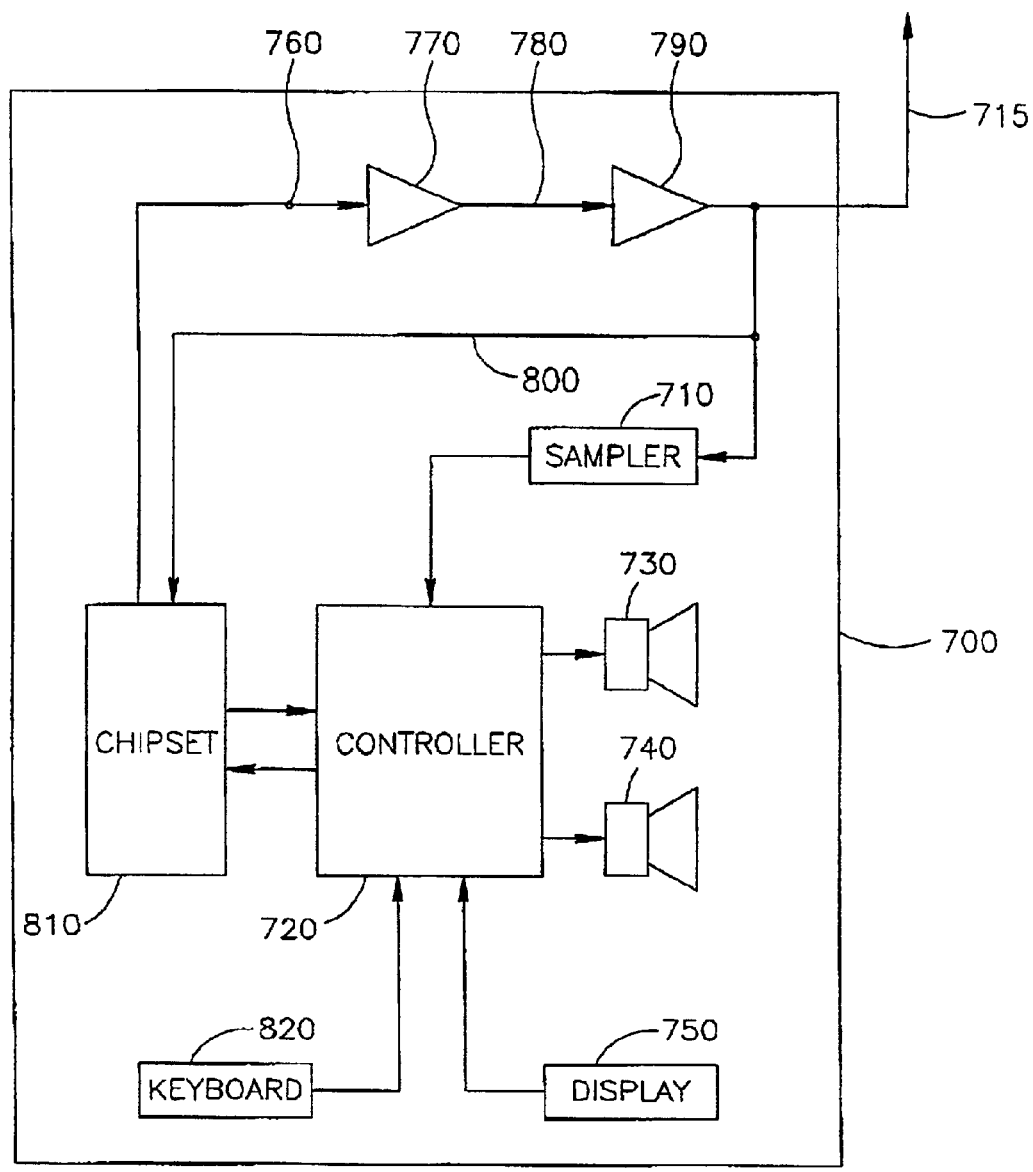
FIG. 5 is a schematic illustration of the electrical components of a cellular telephone having radiation detection capabilities in accordance with some embodiments of the present invention.

Reference is now made to FIG. 5, which is a schematic illustration of the electrical components of a cellular telephone 700 having an antenna 715 according to some embodiments of the present invention. In these embodiments, a radiation meter and an alarm may be embedded in the cellular telephone using the standard display and audio and/or buzzer capabilities of the telephone. This feature may be realized by a separate menu in the telephone operation-menu. The realization of a radiation alert feature in a standard cellular telephone may be enabled using the existing hardware of the telephone set. Nevertheless, since telephone manufactures declare that cellular telephones are safe and comply with international radiation standard, they would not be motivated to add an alert feature.

Cellular telephone 700 may comprise an RF sampling unit 710 and an amplifier 790, both coupled to antenna 715, a preamplifier 770 coupled to amplifier 790 and a controller 720 coupled to RF sampling unit 710. Controller 720 may be adapted among other functions to compute over time measurements received from RF sampling unit 710. These measurements are compared to a predefined reference level. Cellular telephone 700 may further comprise a buzzer 730, a speaker 740, a display 750, a standard chipset 810 and a keyboard 820, all coupled to controller 720.

RF sampling unit 710 may feed controller 720, which in turn may drive buzzer 730 and/or speaker 740 using a preprogrammed audio message. Additionally or alternatively controller 720 may send a message to the cellular telephone's existing display 750. The alert may occur each time that the radiation level exceeds the predefined threshold.

An alternative to RF sampling unit 710 may be locating a sampling tap (not shown) at a point 760 between preamplifier 770 and chipset 810 or at a point 780 between preamplifier 770 and amplifier stage 790. It should be noted that this alternative is less accurate than utilizing, RF sampling unit 710 since it may not account for in-matching or reflected power of antenna 715.

For the sake of clarity, additional components of the cellular telephone 700 have been drawn in schematically, including the cellular telephone's reception chain 800, chip set 810 and the keyboard 820.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A radiation-alerting device for use with a cellular telephone comprising:
   a radio frequency (RF) sampling unit adapted to measure the amplitude of an electromagnetic field generated by said cellular telephone over time, said RF sampling unit is configured to be operable with any of a group of cellular communication systems including analog, digital, GSM, TDMA and CDMA;
   a computing unit coupled to said RF sampling unit, said computing unit adapted to compute said amplitude over time and to compare with a predefined reference level; and
   an alerting unit coupled to said computing unit and adapted to output an alert whenever said electromagnetic field exceeds said predefined reference level,
   wherein said device is attachable to said cellular telephone.

2. The device according to claim 1, wherein said amplitude is formed by a modulation type of any of a group including continuous wave (CW), pulse and spread spectrum.

3. The device according to claim 1, wherein said predefined reference level is any of a group including ICNIRP standard and ANSI/IEEE standard with relation to reference level and integration times.

4. The device according to claim 1 further comprising a miniature battery in communication with said RF sampling unit, said computing unit and said alerting unit.

5. The battery according to claim 4, wherein said miniature battery is a rechargeable battery and further adapted to use radiation emitted from said cellular telephone for recharging.

6. The device according to claim 1, wherein said RF sampling unit is any of a group including a rectifier, high-efficiency low-loading turn and equivalent RF sampler.

7. The device according to claim 1, wherein said computing unit is a micro-controller.

8. The device according to claim 1, wherein said alerting unit comprises a liquid crystal display.

9. The device according to claim 1, wherein said alerting unit comprises a buzzer driven by an oscillator.

10. The device according to claim 1, wherein said alerting unit comprises a liquid crystal display and a buzzer.

11. The device according to claim 1, wherein said alerting unit comprises a light emitting diode display.

12. The device according to claim 1 further comprising means for supplying electrical power to said computing unit and to said alerting unit by utilizing RF radiation emitted by said cellular telephone.

13. The device according to claim 1, wherein said predefined reference level comprises at least one of a group of levels including a peak level, an average short term level and an average long term level.

14. The device according to claim 1, wherein said predefined reference level is related to the mode of operation of the user, wherein said mode of operation corresponds to the distance between an antenna coupled to said cellular telephone and the head of said user.

15. The device according to claim 14, further comprising a multi-state manual mode-switch configured to set said computing unit according to said mode of operation.

16. The device according to claim 1, further comprising a double-sided adhesive strip attachable to said device and said cellular telephone.

17. The device according to claim 1, wherein said device is embedded within a replaceable cover of said cellular telephone.

18. The device according to claim 1, further comprising a squelch circuit enabling said computing unit and said alerting unit with electrical power only when a certain threshold radiation is detected through said RF sampling unit.

19. The device according to claim 1, further comprising means for connecting said RF unit, said computing unit and said alerting unit to an external accessory socket of said cellular telephone.

20. The device according to claim 19, wherein said means for connecting comprises a plug.

21. The device according to claim 20, wherein said plug is adapted to provide said direct current (DC) power from a battery of said cellular telephone battery.

22. The device according to claim 20, wherein said plug is engaging the "end" pins within said external accessory socket and said device further comprising an analog switch configured to disconnect ongoing calls by sending an "end" command through said "end" pins, when the radiation level exceeds said predefined reference level.

23. The device according to claim 20, wherein said device further comprising a direct current (DC) power supply adapted to draws power from the radiation emitted by said cellular telephone.

24. A radiation-alerting device for use with a cellular telephone comprising:
   a radio frequency (RF) sampling unit adapted to measure the amplitude of an electromagnetic field generated by said cellular telephone over time, said RF sampling unit is configured to be operable with any of a group of cellular communication systems including analog, digital, GSM, TDMA and CDMA;
   a computing unit coupled to said RF sampling unit, said computing unit adapted to compute said amplitude over time and to compare with a predefined reference level;
   an alerting unit coupled to said computing unit and adapted to output an alert whenever said electromagnetic field exceeds said predefined reference level; and
   means for supplying electrical power to said computing unit and to said alerting unit by utilizing RF radiation emitted by said cellular telephone,
   wherein said device is attachable to said cellular telephone.

25. The device according to claim 24, wherein said means for supplying electrical power comprises any of a group including a high-efficiency low-loading turn coupled to a diode-capacitor rectifier and a parallel conductor coupled to said diode-capacitor rectifier.

26. The device according to claim 25, wherein said means for supplying electrical power further comprising a voltage regulator.

27. The device according to claim 24, wherein said means for supplying electrical power further comprising mechanical means for attaching said device to an antenna coupled to said cellular telephone.

28. A radiation-alerting battery for use with a cellular telephone comprising:
   a current sampling unit adapted to measure indirectly the amplitude of an electromagnetic field generated by said cellular telephone over time;
   a computing unit coupled to said current sampling unit, said computing unit adapted to compute said amplitude over time and to compare with a predefined reference level; and
   an alerting unit coupled to said computing unit and adapted to output an alert whenever said electromagnetic field exceeds said predefined reference level.

29. The battery according to claim 28, wherein said predefined reference level is any of a group including ICNIRP standard and ANSI/IEEE standard with relation to reference level and integration times.

30. The battery according to claim 28, wherein said current sampling unit is a sampling resistor connected to a (direct current) DC amplifier.

31. The battery according to claim 28, wherein said computing unit is a controller.

32. The battery according to claim 31, wherein said controller is pre-programmed to calculate the accumulated radiation as proportional to the energy consumed from said battery over time.

33. The battery according to claim 28, wherein said alerting unit is a buzzer.

34. A radiation-alerting cellular telephone comprising:
- an RF sampling unit adapted to measure the amplitude of an electromagnetic field generated by said cellular telephone over time;
- a computing unit coupled to said RF sampling unit, said computing unit adapted to compute said amplitude over time and to compare with a predefined reference level; and
- an alerting unit coupled to said computing unit and adapted to output an alert whenever said electromagnetic field exceeds said predefined reference level.

35. The cellular telephone according to claim 34, wherein said predefined reference level is any of a group including ICNIRP standard and ANSI/IEEE standard with relation to reference level and integration times.

36. The cellular telephone according to claim 34, wherein the operation of said alerting unit is determined by a user from a menu item available on said cellular telephone.

37. The cellular telephone according to claim 34, wherein said RF sampling unit is a sampler coupled to an antenna of said cellular telephone and adapted to feed an existing controller chip.

38. The cellular telephone according to claim 34, wherein said RF sampling unit is a sampling tap located either before an existing pre-amplifier coupled to an antenna or in between an existing amplifier stage and said preamplifier.

39. The cellular telephone according to claim 34, wherein said computing unit is an existing controller chip of said cellular telephone.

40. The cellular telephone according to claim 34, wherein said alerting unit is at least one of a group including a standard buzzer integrated in said cellular telephone, a speaker, a liquid crystal display and any combination thereof.

41. A radiation-alerting device for use with a cellular telephone comprising:
- radio frequency (RF) sampling means for measuring the amplitude of an electromagnetic field generated by said cellular telephone over time;
- computing means for computing said amplitude over time and to compare with a predefined reference level; and
- alerting means for outputting an alert whenever said electromagnetic field exceeds said predefined reference level, wherein said device is attachable to said cellular telephone.

* * * * *